March 10, 1959     M. W. NEUHAUSEN     2,876,593
GLASS TEMPERING APPARATUS

Filed Sept. 28, 1954     9 Sheets-Sheet 1

INVENTOR.
MARTIN W. NEUHAUSEN
BY Oscar L. Spencer
HIS ATTORNEY

March 10, 1959 M. W. NEUHAUSEN 2,876,593
GLASS TEMPERING APPARATUS
Filed Sept. 28, 1954 9 Sheets-Sheet 2

INVENTOR.
MARTIN W. NEUHAUSEN
BY Oscar L. Spencer
HIS ATTORNEY

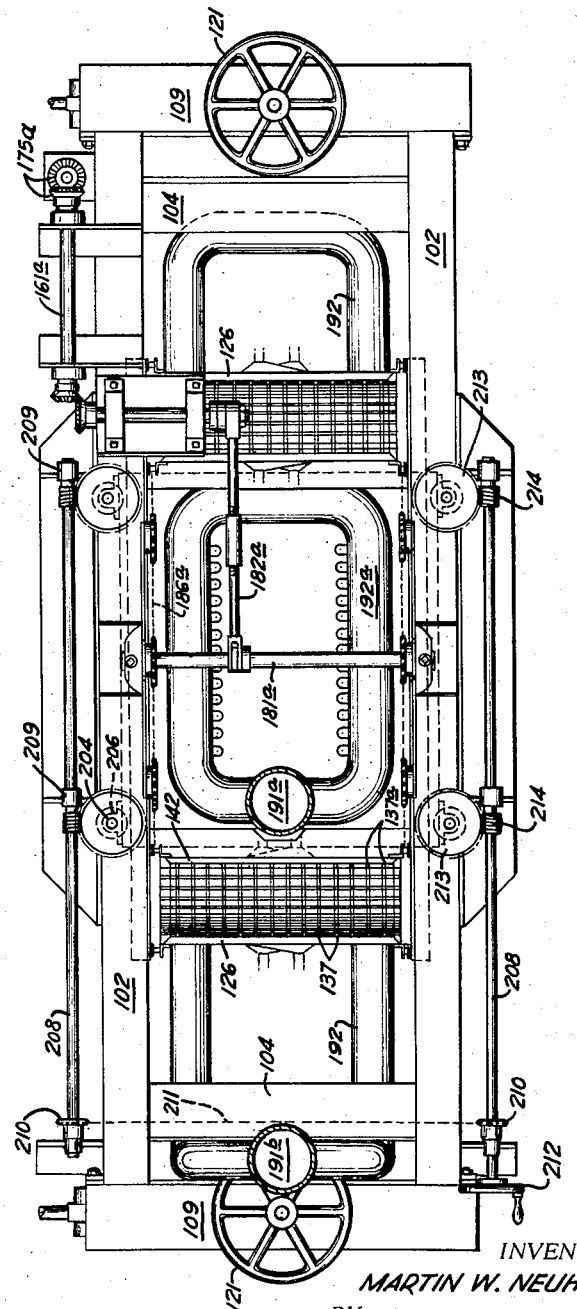

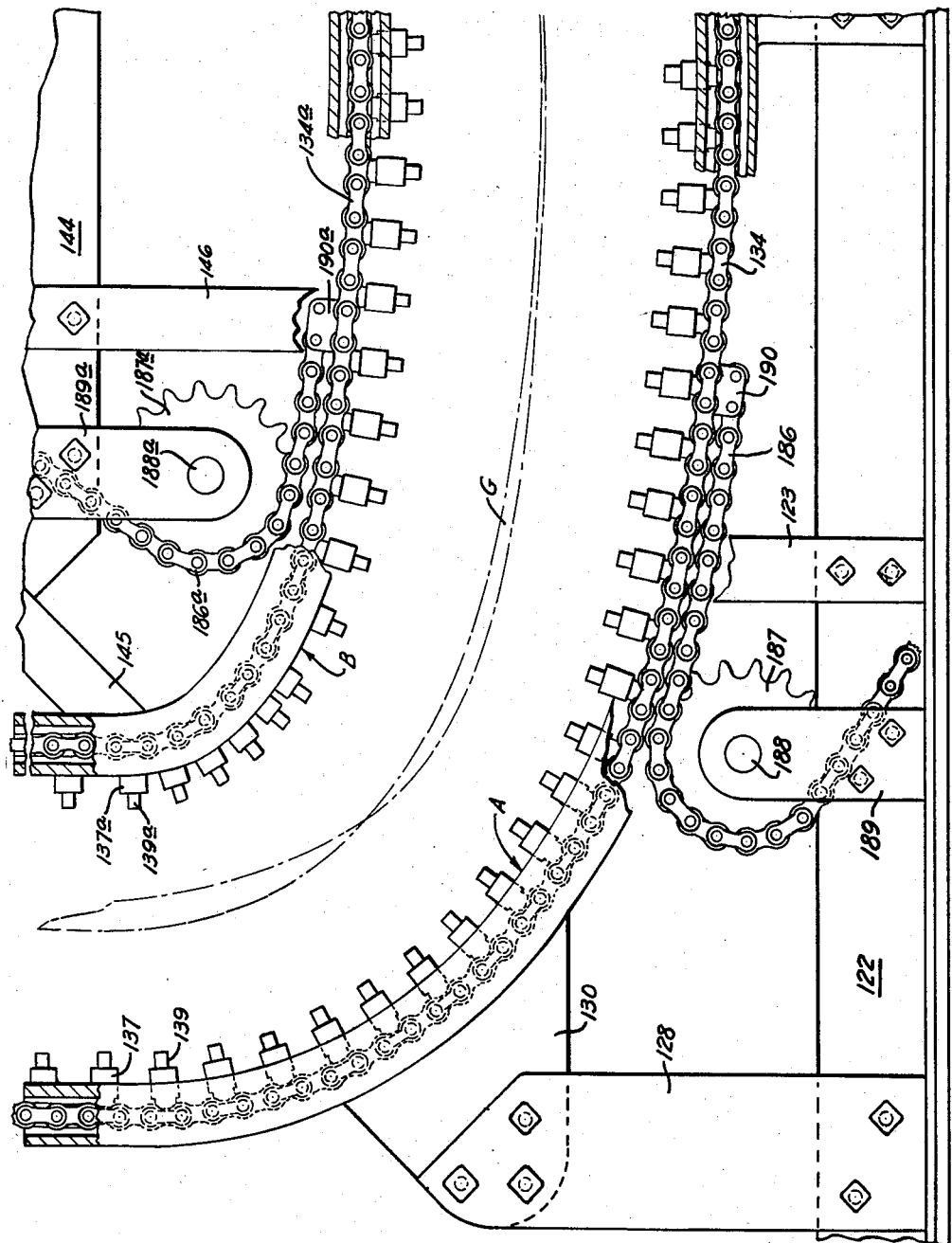

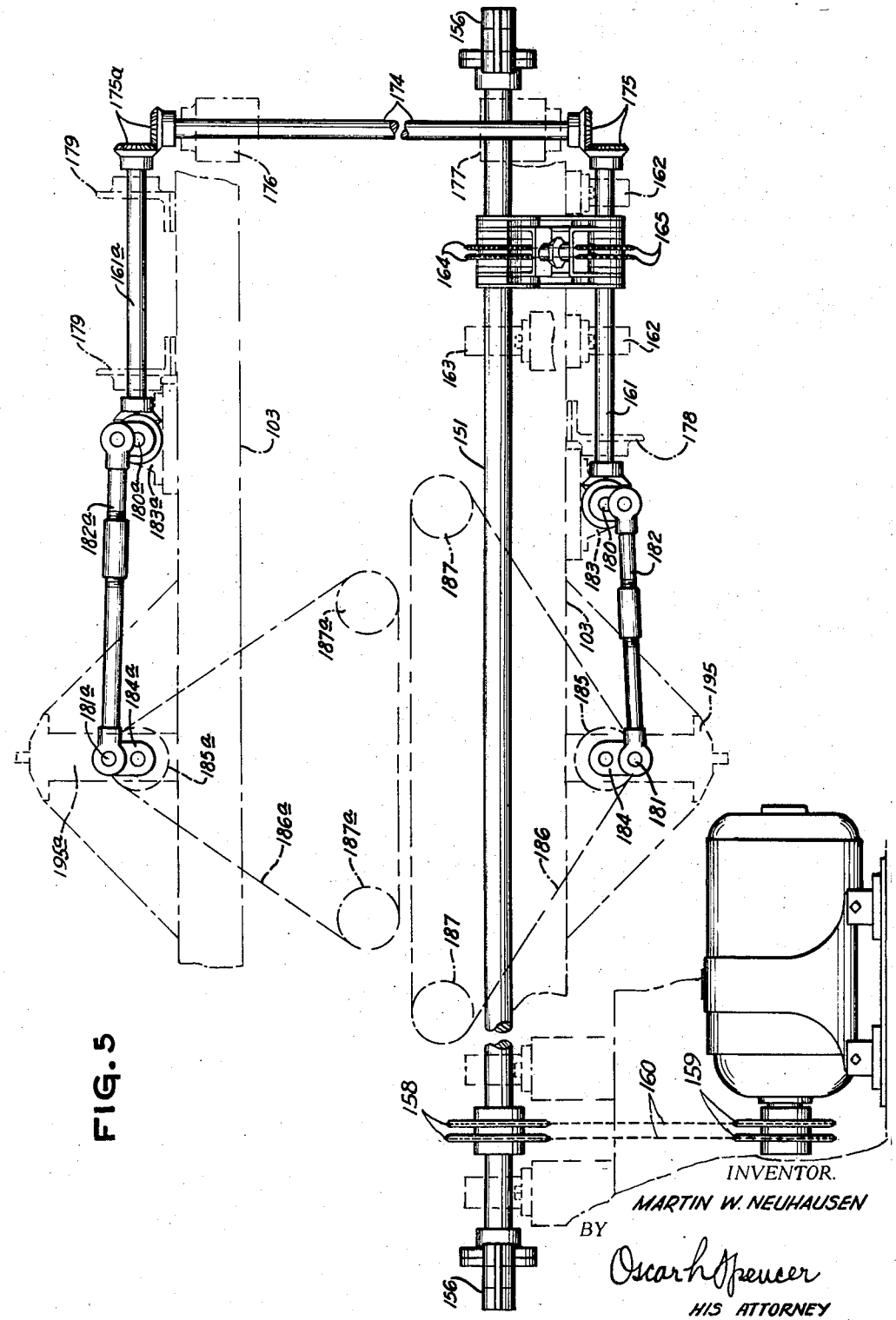

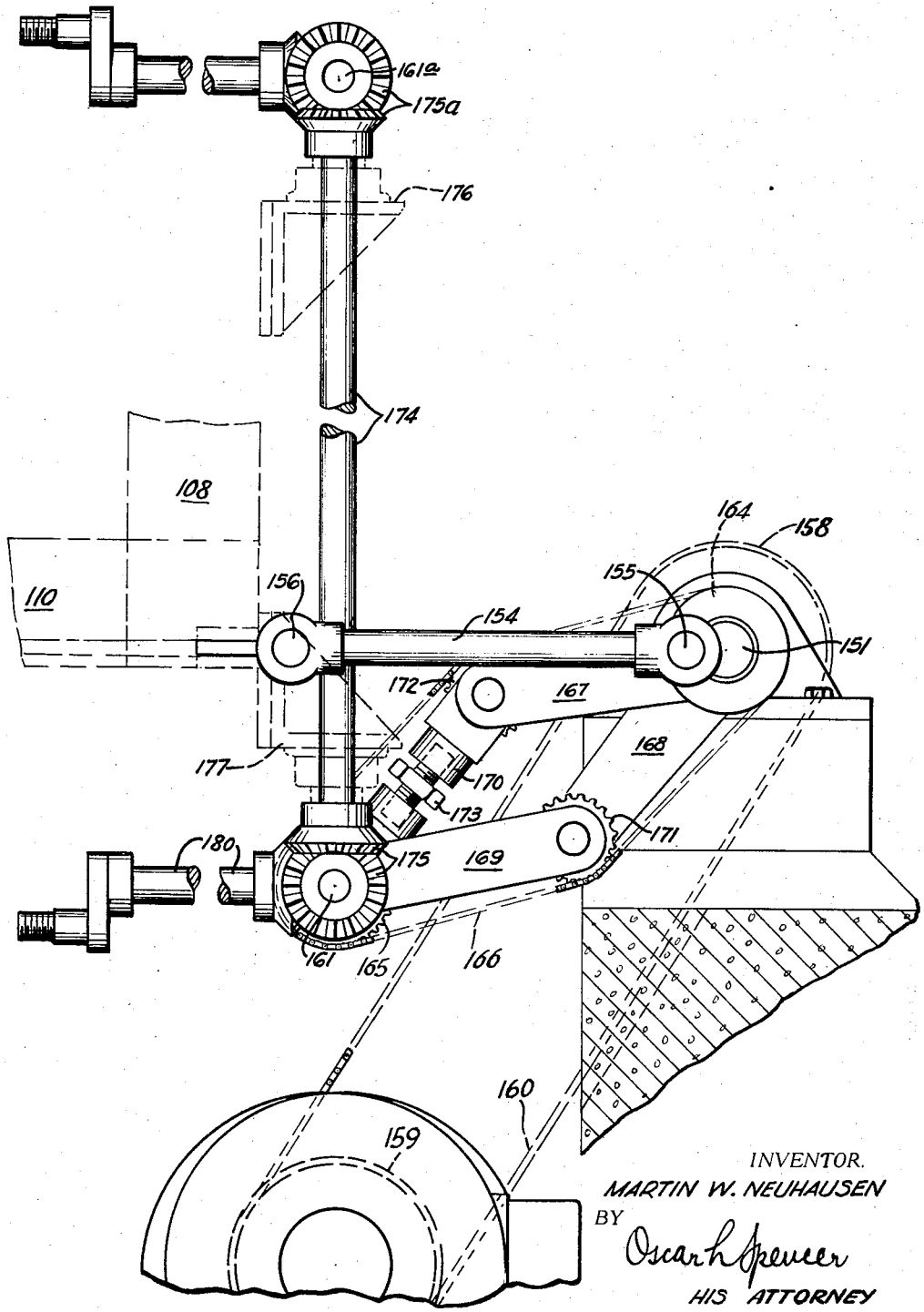

March 10, 1959 M. W. NEUHAUSEN 2,876,593
GLASS TEMPERING APPARATUS
Filed Sept. 28, 1954 9 Sheets-Sheet 7
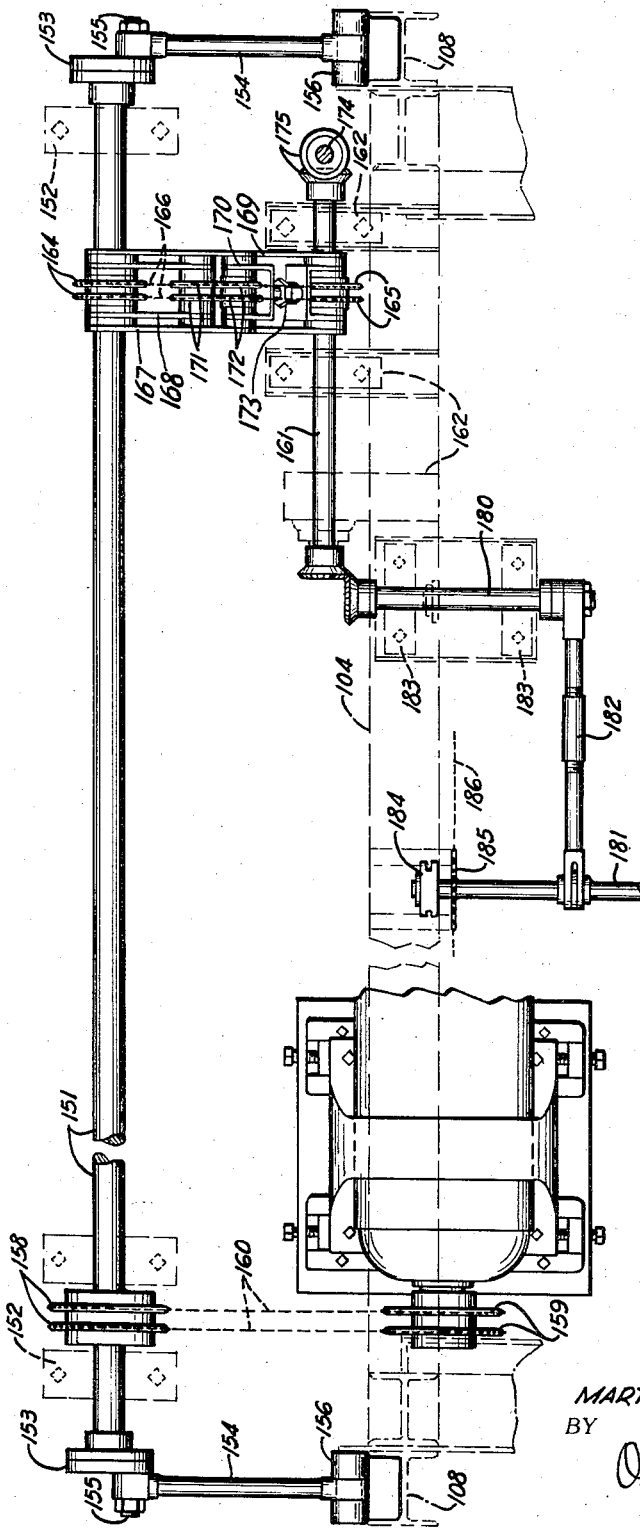
FIG. 7
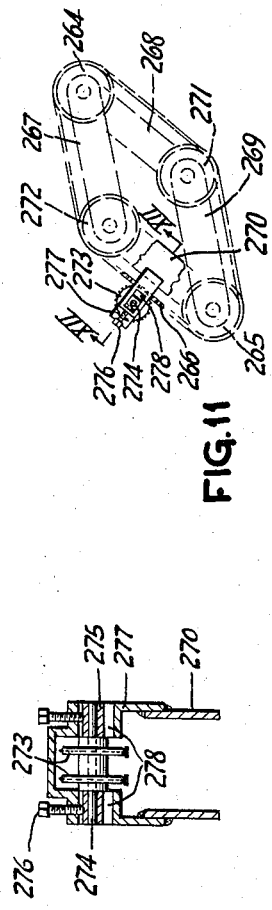
FIG. 11
FIG. 12
INVENTOR.
MARTIN W. NEUHAUSEN
BY
Oscar L. Spencer
HIS ATTORNEY

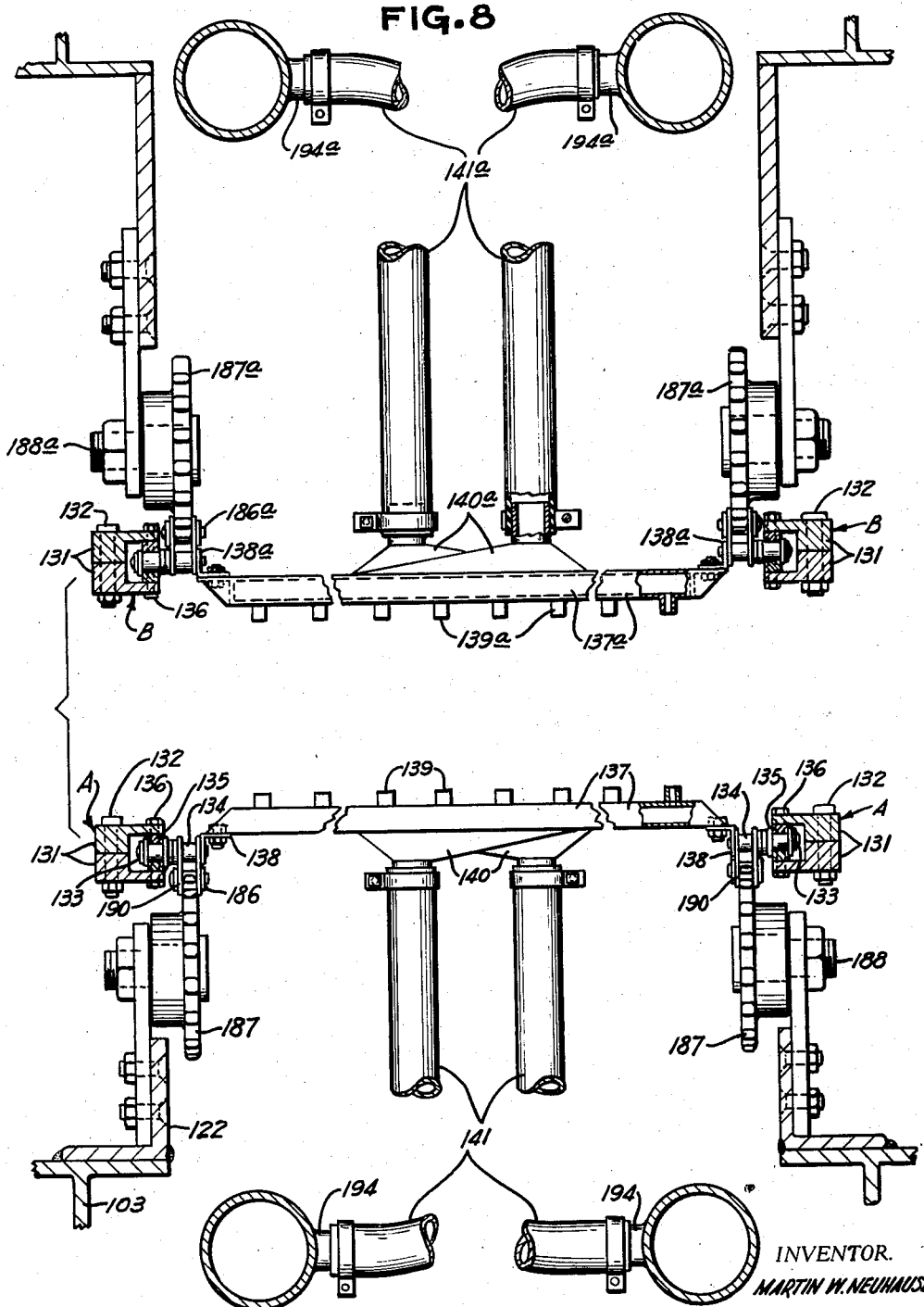

United States Patent Office 2,876,593
Patented Mar. 10, 1959

2,876,593
GLASS TEMPERING APPARATUS

Martin W. Neuhausen, Zelienople, Pa., assignor to Pittsburgh Plate Glass Company, Allegheny County, Pa., a corporation of Pennsylvania Application September 28, 1954, Serial No. 458,859

13 Claims. (Cl. 49—45)

This invention pertains to apparatus for tempering glass and, more specifically to apparatus which imposes an even temper upon a curved glass sheet.

The basic process involved in tempering glass is old and well known in prior art patents. Basically, the process comprises heating a glass sheet above its annealing range and rapidly cooling the surfaces of the sheet while the center is still hot. This action results in a sheet having its outer surface in compression and its intermediate area in tension. Such conditions render the sheet much stronger than untempered glass. Therefore, when the outer surface or compression skin is broken, the stresses locked up within the glass cause it to shatter into a large number of very small pieces. The uniformity of size of the shattered pieces is a good indication of the uniformity of the degree of temper throughout the surface of the glass.

Typical prior art tempering apparatus include nozzles disposed on opposite sides of a glass sheet for directing a plurality of air blasts against the adjacent surface of the sheet and means for imparting a movement to the nozzles to prevent formation of temper patterns on the glass surface. Where the glass sheet is flat or includes shallow bent portions, the nozzles may be rotated in a flat plane substantially parallel to the general plane of the sheet to obtain satisfactory tempering.

When the glass sheet is provided with deep bends at its longitudinal extremities, as in the present day automobile windshields and back lights, a circular movement imparted to the nozzles causes the latter to move toward and away from the bent end portions of the sheet. Such action causes non-uniformity of temper and also inhibits obtaining the desired degree of temper. When the nozzles move toward the sheet, the air, after impinging upon the sheet, is prevented from escaping to admit additional cold air. This results in slow cooling and prevents obtaining the desired temper. When the nozzles move away from the sheet, the rate of cooling is also decreased by reason of the greater diffusion of the cold air blast with the air warmed by virtue of its adjacency to the heated glass.

The principal object of the present invention is to provide apparatus for imparting uniform temper to a glass sheet bent along an axis of non-uniform curvature.

Another object of the invention is to provide tempering apparatus which comprises blast nozzles for imparting a uniform blast of tempering fluid substantially normally to the sheet wherein the blast nozzles are maintained a substantially uniform distance from the sheet.

Another object of the invention is to provide a novel tempering apparatus in which a plurality of guided reciprocating and oscillating movements are combined to produce a uniform diffusion of cool tempering fluid upon the glass.

These and other objects will be made apparent in the following description and drawings forming a part thereof in which:

Fig. 3 shows a plan view of the tempering apparatus with certain details omitted for clarity, looking along the lines III—III of Fig. 1;

Fig. 4 shows in enlarged detail the air blast boxes and the supports therefor which form part of the tempering apparatus of Fig. 1;

Fig. 5 shows in enlarged detail the actuating means for the air boxes of Fig. 4;

Fig. 6 shows in enlarged detail another view of the actuating means for the air blast boxes and its mounting on the fixed support structure;

Fig. 7 is a plan view, in enlarged detail, of the air blast box actuating means;

Fig. 8 is a section taken on lines VIII—VIII of Fig. 1;

Fig. 11 is a side view of an alternate form of take up means;

Fig. 12 is an enlarged sectional view along the lines XII—XII of Fig. 11.

Figure 1:
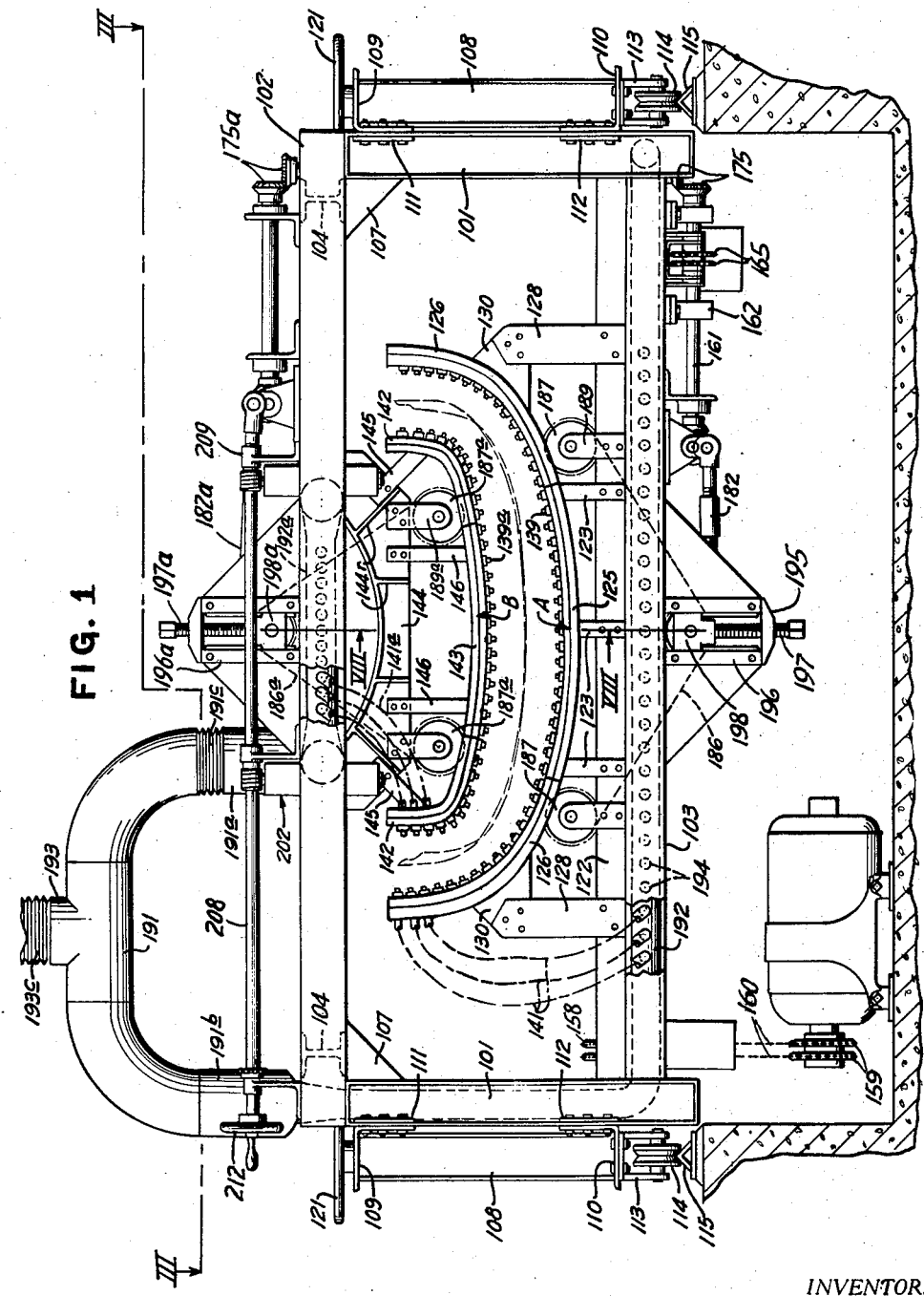
Fig. 1 shows a front elevation view, partly in section, of an embodiment of tempering apparatus according to the present invention, with certain parts omitted for clarity.
Figure 2:
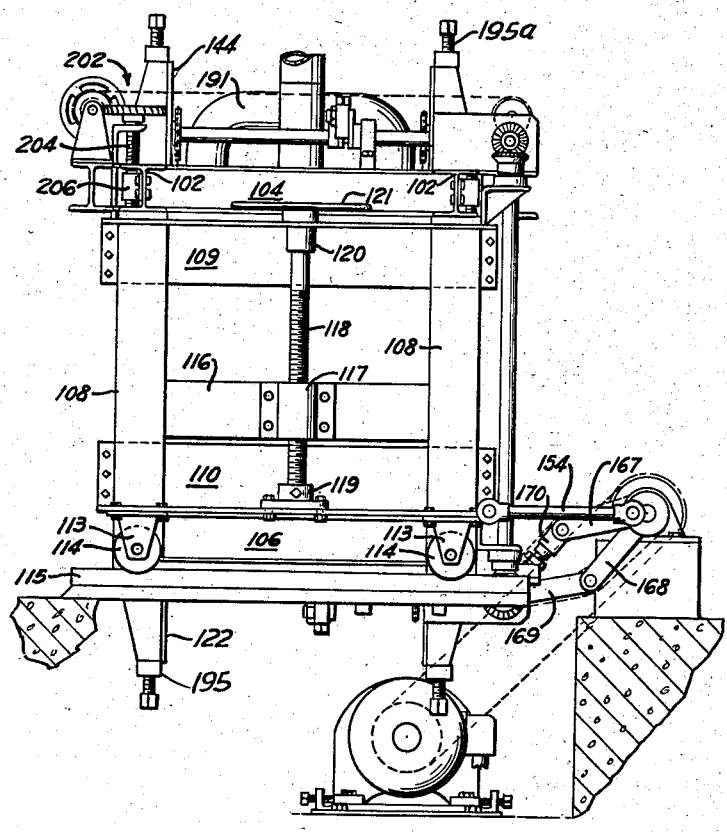
Fig. 2 shows a side elevation view showing certain essential elements of the tempering apparatus of Fig. 1.

Referring now to Figs. 1 and 2, the apparatus is provided with a main substantially rectangular frame comprising vertically disposed side members 101 connected by top members 102, bottom members 103, top side members 104 (Figure 2) and bottom side members 106. The connections between side members 101 and the top members 102 are reinforced by gusset plates 107. This main frame is adjustably supported by four corner posts 108. The two corner posts 108 at each side of the main frame are connected by upper and lower L-shaped cross plates 109 and 110, respectively. The cross plates 109 and 110, in turn, are connected to the side members 101 by bolted connector plates 111 and 112. A pair of downwardly extending brackets 113 is connected to each cross plate 110. A wheel 114 is mounted within each bracket 113 for engaging tracks 115 at each side of the main frame.

Tie members 116 are rigidly attached to the adjacent corner posts 108 at each side of the frame. Mounted on each tie member 116 is an internally threaded housing 117. Extending through the internally threaded housing 117 is a screw threaded shaft 118 having its bottom end journaled in a bearing 119 attached to the lower cross plate 110 and its upper end journaled in a bearing 120 attached to the upper cross plate 109. The upper end of the shaft 118 extends through the bearing 120 to receive an operating wheel 121.

Within the main frame, mounted on the top and bottom members 102 and 103, are spaced pairs of guide rails A and B for the air boxes. Guide rails A, for guiding the bottom air boxes are constructed to conform substantially to the glass curvature in a plurality of sections fixed together in end to end relation with the end sections readily removable for replacement so that the curvature thereof may be readily modified to suit a different glass pattern when different shapes are to be tempered. Guide rails B for the upper air boxes also conform to the glass curvature and are of a similar construction to guide rails A. Since the central portions of a number of curved glass patterns are of substantially the same curvature while the end sections of the patterns may vary considerably, I prefer to make each guide rail in a plurality of sections. Thus, to accommodate different contours, it is usually necessary to replace the end sections only.

As illustrated in Fig. 1 of the drawings, angle irons 122 are mounted on the bottom main frame members 103 to receive bottom guide rail brackets 123 for supporting each bottom main or center guide rail section 125. These brackets 123 may be integral with the central guide rail section and detachably connected with the angle irons 122. The auxiliary or end sections 126 of each bottom guide rail A are likewise supported upon angle irons 122 by means of brackets 128 detachably connected thereto, and to lugs 130 integral with each end section 126.

Each top and bottom guide rail section, as illustrated in cross-section on Fig. 8, comprises opposed substantially L-shaped members 131 connected by bolts 132. Within the spaced arms of the L-shaped members 131 is disposed a standard roller chain attachment 133, which is pivotally attached to and supports an air box carrying member such as a roller chain link 134. In order to retain the roller chain attachment 133 in position, supporting auxiliary guide rail members 135 are fastened to the members 131 by means of bolts 136. Each auxiliary guide rail member 135 is curved to conform to and extends the full length of a single bottom guide rail section 125 or 126.

Bottom air boxes 137 are suspended between the bottom guide rails A. Each air box 137 may be formed of rectangular aluminum tubing which is closed at each end and which may be attached at each end to a bracket 138. The closed wall of each air box 137 facing the glass sheet has a plurality of nozzles 139 disposed along its length. Suitable apertures connect nozzles 139 with the interior of the air box. Each air box 137 also has a suitable connection 140 for attachment to an air hose 141. The latter provides suitable air pressure within air box 137 for directing air blasts against the glass via nozzles 139. Upper air boxes 137a, suspended between upper guide rails B are attached to brackets 138a, and have nozzles 139a and connections 140a attached to suitable air hoses 141a. Air boxes 137 and 137a thus serve as nozzle housings.

As shown in Fig. 1 of the drawings, the upper air box guide rails B are supported from the main frame members 102 above the glass and cooperate with guide rails A to provide substantially equal and uniformly distributed air on opposite sides of the glass being tempered. Each guide rail B is preferably formed of two auxiliary or end sections 142 and a main or center section 143. Each section is suspended from a main frame member 102 by means of a suitable bracket 144 reinforced by ribs 144r and braces 145 and 146 which interconnect bracket 144 with the guide rail sections.

*Frame operating mechanism*

The main frame reciprocates upon track 115 by means of the supporting wheels 114 as illustrated in Fig. 2 of the drawings. The operating mechanism for reciprocating the frame is shown in Figs. 6 and 7.

Referring now to Fig. 7 of the drawings, a shaft 151 is disposed longitudinally of the main frame and in spaced relation thereto. This shaft is mounted in spaced bearings 152 disposed adjacent each end of the shaft. At each end of shaft 151 are mounted the crank members 153 for rotation with the shaft. A crank arm 154 is connected to each member 153 by means of a pin 155. Each end of the crank arms 154 is mounted in a crank bearing 156. Each bearing 156 is mounted upon the lower cross plate 110 of the main frame. Adjacent one end of the shaft 151 and between the shaft bearings 152, are suitable sprockets 158 keyed to shaft 151 for rotation therewith. These sprockets 158 are in turn connected with the motor sprockets 159 by means of a suitable driving chain such as 160.

*Air box driving mechanism*

As best shown in Figs. 5, 6 and 7 of the drawings, the air boxes are also actuated from the shaft 151. An auxiliary drive shaft 161 is mounted on the main frame bottom member 104, adjacent the shaft 151 by means of the spaced bearings 162 for bodily movement with the main frame. Shaft 161 is rotated or driven by shaft 151 through sprockets 164 on shaft 151 and sprockets 165 on shaft 161. Sprockets 164 and 165 are connected by a suitable means such as chains 166.

The relative movements between shafts 151 and 161, due to reciprocation of the main frame, requires the provision of a special chain adjusting device. This device, best shown in Figs. 6 and 7, comprises pairs of toggle arms 167 and 168 pivotally mounted on shaft 151 and pairs of toggle arms 169 and 170 pivotally mounted on shaft 161. The free ends of the pairs of toggle arms 168 and 169 are pivotally connected together to support idler chain sprockets 171. The free ends of the pairs of toggle arms 170 and 167 are pivotally connected together to support idler chain sprockets 172. Since the maximum distance between centers of shafts 151 and 161 is less than the distance between the shafts along a line through the idler sprockets, the idler sprockets 171 and 172 are always limited in their movement towards each other. Drive sprockets 164 and 165 and idler sprockets 171 and 172 are preferably of equal diameter and have an equal number of teeth. Also, toggle arms 167–170 preferably should be of equal length to insure that the chain tension is not varied as a result of relative movement between the drive shafts.

Turnbuckles 173 are provided in toggle arms 170 to facilitate initial tensioning of chains 166 and to correct for subsequent chain wear. An alternate embodiment of adjustment structure is shown in Figs. 11 and 12. In this latter embodiment, no turnbuckle is required. Instead, toggle arms 267, 268, 269 and 270, corresponding to toggle arms 167–170, respectively are all of fixed, equal length and pivotally connected together in a substantially quadrilateral formation with diagonally opposed driving sprockets 264 and 265, corresponding to driving sprockets 164 and 165, and idler sprockets 271 and 272, corresponding to idler sprockets 171 and 172. All the sprockets are of equal diameter and have the same number of equally spaced teeth. In this embodiment, the tensioning means comprises free-running take-up sprockets 273 mounted on a shaft 274 in a bearing housing 275. Set screws 276 are movable within a U-shaped bracket 277 fixed to toggle arm 270 to adjust the position of the bearing housing in slots 278 within the fixed bracket.

The upper and lower groups of air boxes 137a and 137 are individually driven from a common power source, shaft 151. Where, as in most cases, it appears desirous to locate the air boxes on opposite sides of the glass, a common power source makes the task of synchronizing the movement of the groups of boxes relatively simple. Each drive however, has means for individual adjustment and also provides for variation of the relative direction of movement between the groups of boxes as hereinafter set forth.

Referring now to Figs. 5 and 7 of the drawings, shafts 161 and 161a are connected by a common vertical shaft 174 between a lower pair of miter gears 175 and an upper pair 175a. Shaft 174 is mounted on end posts 101 and top and bottom members 103 and 104, respectively, by means of the bearing brackets 176 and 177 respectively. Shaft 161 is supported by members 104, as previously described, and shaft 161a is supported on members 103 by means of bearing brackets 178 and 179, respectively.

The bottom group of air boxes 137 are preferably oscillated by similar mechanisms comprising the miter gear and crank shaft 180, the crank and sprocket shaft 181 and connecting crank arm 182. Similar mechanisms 180a, and 181a and 182a oscillate upper air boxes 137a. The shafts 180 and 180a are mounted in bearings 183 and 183a on the frame members 104 and 103 respectively. The shafts 181, 181a are similarly mounted in bearings 184, 184a. Upon each shaft 181 and 181a is mounted a sprocket 185 or 185a which in turn is connected by driving chain 186 or 186a to spaced lower sprockets 187 and spaced upper sprockets 187a. Each set of sprockets 185—187 and 185a—187a define, with their chains 186 and 186a, respectively, substantially triangular configurations.

Suitable take-up mechanisms 195 and 195a are provided to insure adequate tension in chains 186 and 186a. For example, take-up mechanism 195 may comprise a bracket 196 secured to an angle iron 122 and a threaded shaft 197 movable with a pulley housing 198 and pulley 185 relative to the bracket. Attached to bracket 144 is upper take-up mechanism 195a, which comprises bracket 196a, threaded shaft 197a and upper pulley housing 198a.

As shown in Fig. 4, the sprockets 187 and 187a are mounted on shafts 188 and 188a journaled in the brackets 189 and 189a mounted on the members 122 and 144, respectively. The chain 186 is connected at each end to the air box supporting chain 134 by a connector 190 and chain 186a to chain 134a by connector 190a. Hence, rotation of shafts 180 and 180a acting through crank arms 182 and 182a, imparts oscillating movement to sprockets 185 and 185a which act through chains 186 and 186a to impart an oscillating movement of air box chains 134 and 134a, respectively. The vertical position of the air boxes 137 and 137a during their oscillation is determined by the shape of the track members A and B which guide the air box chains.

*Air feed and distribution*

Each air box 137 and 137a is provided with a plurality of air nozzles 139 and 139a, respectively, which direct streams of air against the glass in order to chill the surface during the tempering operation. The pressure required to blow the air through the nozzles 139 and 139a varies with the degree of temper desired and the shape of the glass. This air pressure may vary from less than 0.5 pound to 5.0 pounds. The apparatus herein described is designed to provide any necessary air pressure uniformly from each nozzle. This uniformity is insured by providing a plurality of air boxes and by connecting each box separately to a common source of supply.

Referring now to Figs. 1, 2 and 3 of the drawings, the air supply for the air boxes comprises a substantially inverted U-shaped conduit 191 disposed adjacent one end of the frame and supported thereon. While the U-shaped conduit 191 may have a counterpart on the other side of the apparatus, the second conduit has been omitted from the drawings for the sake of clarity.

The conduit has two depending legs 191a and 191b connected to an upper and lower conduit 192a and 192, respectively, extending horizontally longitudinally of the frame. The top of each U-shaped conduit 191 is provided with an air inlet 193. At spaced intervals along conduits 192 and 192a are suitable outlet nozzles 194 and 194a (Fig. 8) connected by a flexible hose 141 or 141a to the inlet 140 or 140a of an air box 137 or 137a. The upper conduit feeds the upper air boxes while the lower conduit feeds the lower air boxes. Suitable air pressure is then imparted via each air supply conduit to each air box to provide the required air pressure at each air box outlet nozzle 139 and 139a.

Air inlet 193 is made adjustable at 193c to facilitate vertical adjustment of the entire assembly. Likewise, conduit 191a, which feeds the upper air nozzles, is made adjustable at 191c to facilitate vertical adjustment of the upper air boxes only, thus enabling adjustment of the width of the space between the upper and lower air boxes where the glass is held during tempering.

*Frame and air box adjustment*

Referring now to Figs. 1 and 2, the main frame of the apparatus is vertically adjustable relative to the tracks 115 and supporting wheels 114. This is accomplished through the hand wheels 121 and the screw threaded shaft 118 which are supported on the wheel brackets 113 and directly connected to the main frame by means of the screw threaded housing 117 mounted on the main frame. By loosening the bolts 112 in the cross plate 110, the entire main frame may be raised or lowered by suitable rotation of the hand wheels 121 at each end of the main frame. During this adjustment the entire weight of the frame is supported on the two screw threaded shafts 118 and the housings 117. After the bolts 112 are tightened, the main frame and members 108 are secured together to provide a rigid unitary structure.

Figs. 1, 2 and 3 of the drawings show how the top platen and assembled air boxes may be adjusted relative to the bottom platen and assembled air boxes. Brackets 144, which support upper track sections 142, 143 and 142 through braces 145 and 146, are supported on each main frame brace 102 by subframes 202 movable with externally threaded members 204 upon internally threaded bearing members 206. When the members 204 are rotated, the sub-frame 202 is raised or lowered relative to the main frame and the bottom platen. In order to synchronize the rotation of members 204, an operating mechanism connecting all the four members 204 is provided. This mechanism comprises shafts 208 at each side of the top of the main frame, which are journaled in bearings 209. Sprockets 210, adjacent one end of each shaft 208 on opposite sides of the frame, are connected by a suitable chain 211. A hand wheel 212 on one end of one shaft 208 causes rotation of both shafts 208 thru the sprockets 210 and chain 211. A suitable worm gear 213 is mounted on each threaded member 204 in engagement with suitable worms 214 on each shaft 208. Rotation of hand wheel 212 uniformly raises and lowers the top platen.

Figure 9:
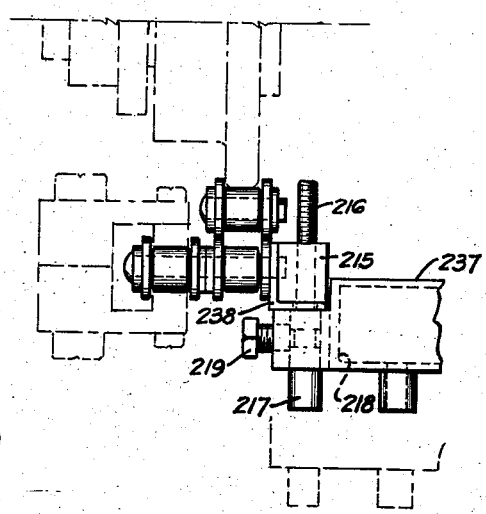
Fig. 9 shows in enlarged detail a means for adjusting the air blast boxes relative to the glass.

Referring now to Fig 9 of the drawings, the individual air boxes may also be adjusted relative to the supporting chain of each platen. Here each chain bracket 238 is provided with an internally threaded member 215 through which is threaded a screw member 216 having a suitable head portion 217. A bracket 218 suspends the air box 237 from the screw head portion 217 in such a manner as to permit rotation of the head portion 217 relative to the bracket 218 for the purpose of moving the air box towards and away from the chain bracket 238. A locking device, such as the screw 219, retains the air box in engagement with screw head portion 217 and may be manipulated to prevent rotation of the head portion 217.

*Operation of the apparatus*

The apparatus combines two movements in mutually perpendicular planes to produce overlapping circular patterns of air blast upon a curved glass sheet disposed intermediate the air blast nozzles. This result is obtained by bodily moving the entire apparatus back and forth in a straight line upon the tracks 115, while the air blast nozzles are oscillated at right angles to the path of movement of the frame and along a path conforming to the contour of the bent glass sheet independently supported within the frame. When, however, the glass sheet is substantially flat and the path of movement of the air nozzle is parallel to the plane of the glass sheet, the same overlapping circular patterns are formed by the air blast upon the flat sheet.

Figure 10:
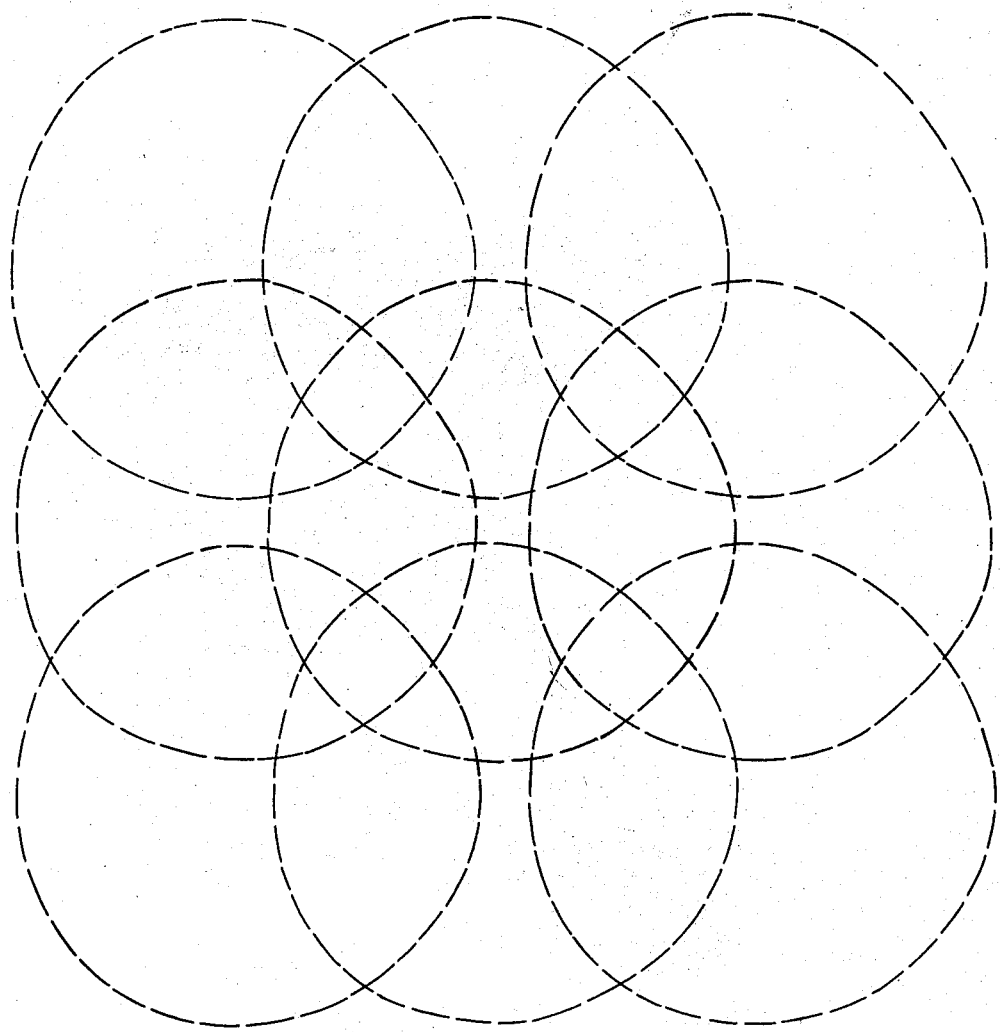
Fig. 10 is a diagrammatic showing of the path of movement of the individual air blast nozzles relative to the glass in effecting the tempering operation.

Upon reference again to Figs. 1 and 5 of the drawings it will be observed that crank 153 moving the main frame and the cranks 181 and 181a moving the air boxes are 90° out of phase with each other. This is necessary to produce the required circular pattern relative to the glass that is shown in Fig. 10.

Furthermore, the air boxes at opposite sides of the glass are set to move in unison relative to the glass. With this arrangement, each individual air blast nozzle

What is claimed is:

1. Apparatus for tempering a non-uniformly curved sheet of glass comprising permanently curved guide members spaced from each other and having a shape parallel to the contour of the non-uniformly curved sheet, each guide member including a permanently curved main guide section and a curved auxiliary guide section attached releasably to said apparatus in end to end relation with an extremity of the permanently curved main section, means for reciprocating said permanently curved guide members transversely of their permanently curved dimensions, opposed nozzle means supported in flexible relation along said permanently curved guide members to define a curved space, means for supporting a curved glass sheet in the space between said nozzle means, and means for oscillating said nozzle means along curved paths defined by said permanently curved guide members out of phase with the reciprocations of the latter.

2. Apparatus as in claim 1, wherein each main guide section is flanked at each extremity by a removable permanently curved auxiliary guide section.

3. Apparatus according to claim 2, wherein each permanently curved main guide section is bent longitudinally along a curvature of relatively large radii and each permanently curved auxiliary guide section is bent longitudinally along a curvature including relatively small radii.

4. Apparatus as in claim 2 wherein the shape of the guide members defines a changing radius of curvature along an axis thereof, the extremities of the guiding means being bent to extreme curvatures and the central portion defining a relatively gentle curve to conform to the curvature of the bent glass to be tempered.

5. Apparatus as in claim 1, comprising driving means which synchronize the oscillation of the nozzle housings with each other and with the reciprocation of the frame.

6. Apparatus as in claim 1, wherein the permanently curved guide members are arranged in opposed pairs and the nozzle means extend between the members of either pair.

7. Apparatus as in claim 6, including means for adjusting the space between the opposed pairs of permanently curved guide members.

8. Apparatus as in claim 6, wherein the nozzle means comprise elongated nozzle boxes extending longitudinally between permanently curved guide members and pivoting means interconnecting adjacent nozzle boxes, said nozzle boxes including spaced nozzles opening into the space separating the opposed nozzle means.

9. Apparatus as in claim 8, wherein the reciprocating means are constructed to apply amplitudes of movement to said guide members and said nozzle boxes that exceed the spacing between adjacent nozzles.

10. In apparatus for tempering a curved sheet of glass by imparting tempering fluid to opposite surfaces thereof, spaced guide means having a permanently curved contour substantially parallel to the opposing surfaces of a curved glass sheet, spaced means for imparting tempering fluid to the opposing surfaces of the curved glass, said means constrained to oscillate in the direction of said guide means, means for reciprocating the guide means in quadrature with the oscillation of the imparting means, and means for supporting curved glass between said spaced means, said spaced guide means comprising a permanently curved center guide means section and permanently curved end guide means section attached releasably to the opposite extremities of the permanently curved center guide means section.

11. In apparatus for tempering a curved glass sheet by imparting tempering fluid to opposite surfaces thereof, a frame, track means for guiding the movement of the frame, means for imparting a reciprocating motion to the frame along said track means, a set of upper air boxes connected in side by side relation, a set of lower air boxes connected in like manner, an upper pair of substantially parallel, horizontally spaced guide rails and a lower pair of substantially parallel, horizontally spaced guide rails spaced from said upper pair and substantially parallel thereto, said guide rails extending in planes perpendicular to the direction of the track means, each upper air box extending across the distance between the upper guide rails and each lower air box extending across the distance between the lower guide rails, spaced nozzle members extending from each air box toward its opposite member of the other set of air boxes, the nozzle member extremities being spaced from each other to provide room for inserting a curved sheet of glass therebetween, means for imparting fluid to said air boxes for blowing the fluid against opposed surfaces through said nozzles, and means for oscillating the air boxes along the guide rails in quadrature with the reciprocation of the frame, each guide rail comprising a permanently curved center member and replaceable permanently curved end members coupled to either end of the center member, the longitudinal configuration of each guide rail being substantially parallel to the curvature along an axis of the glass sheet to be tempered.

12. In tempering apparatus according to claim 11, wherein each guide rail comprises a series of pairs of opposed substantially L-shaped members connected together, a roller chain attachment disposed between each pair, an air box carrying member pivotally attached to each roller chain attachment, and auxiliary guide rail members shaped to conform to the guide rail fastened to the L-shaped members and extending in end to end relationship to full length of the guide rail.

13. In combination with apparatus for tempering non-uniformly curved sheets of glass comprising permanently curved guide members spaced from each other and having a shape parallel to the contour of non-uniformly curved sheets, each guide member including a permanently curved main guide section having a shape parallel to the contour of the central portion of the sheet and a permanently curved auxiliary guide section having a shape parallel to the contour of an extremity portion of the non-uniformly curved sheets, said permanently curved auxiliary guide section being attached releasably to said apparatus in end to end relation with an extremity of the permanently curved main section, means for reciprocating said permanently curved guide members transversely of their permanently curved dimensions, opposed nozzle means supported in flexible relation along said permanently curved guide members to define a curved space, means for supporting a curved glass sheet in the space between said nozzle means, and means for oscillating said nozzle means along curved paths defined by said permanently curved guide members out of phase with the reciprocations of the latter; additional auxiliary guide sections having a curvature different from the curvature of said permanently curved auxiliary guide sections for substitution for said permanently curved auxiliary guide section in releasable attachment to said apparatus in end to end relation with said extremity of said permanently curved main section to provide preformed permanently curved guide members having a shape conforming to a pattern different from the pattern provided by the preformed guide members including said permanently curved main guide section and said permanently curved auxiliary guide section.

(References on following page)

References Cited in the file of this patent

UNITED STATES PATENTS

| | | |
|---|---|---|
| 1,808,588 | Allen | June 2, 1931 |
| 2,106,918 | Perazzoli | Feb. 1, 1938 |
| 2,137,061 | Quentin | Nov. 15, 1938 |
| 2,140,282 | Drake | Dec. 13, 1938 |
| 2,166,427 | Drake | July 18, 1939 |
| 2,369,368 | Paddock et al. | Feb. 13, 1945 |
| 2,514,211 | Carlson | July 4, 1950 |
| 2,553,722 | Peigney | May 22, 1951 |
| 2,646,647 | Bamford et al. | July 28, 1953 |

FOREIGN PATENTS

| | | |
|---|---|---|
| 443,804 | Great Britain | Mar. 6, 1936 |
| 504,191 | Great Britain | Apr. 20, 1939 |
| 365,130 | Italy | Nov. 23, 1938 |

UNITED STATES PATENT OFFICE
CERTIFICATE OF CORRECTION

March 10, 1959

Patent No. 2,876,593

Martin W. Neuhausen

It is hereby certified that error appears in the printed specification of the above numbered patent requiring correction and that the said Letters Patent should read as corrected below.

Column 5, line 25, for "of air box" read -- to air box --; column 7, line 15, for "a curved auxiliary" read -- a permanently curved auxiliary --; lines 38 and 39, for "extremities of the guiding means" read -- extremities of the guide members --.

Signed and sealed this 18th day of August 1959.

(SEAL)
Attest:

KARL H. AXLINE
Attesting Officer

ROBERT C. WATSON
Commissioner of Patents